Sept. 7, 1954 — E. G. BACKUS — 2,688,310
SELF-CLEANING WATERING TROUGH FOR POULTRY
Filed Dec. 28, 1951 — 2 Sheets-Sheet 1
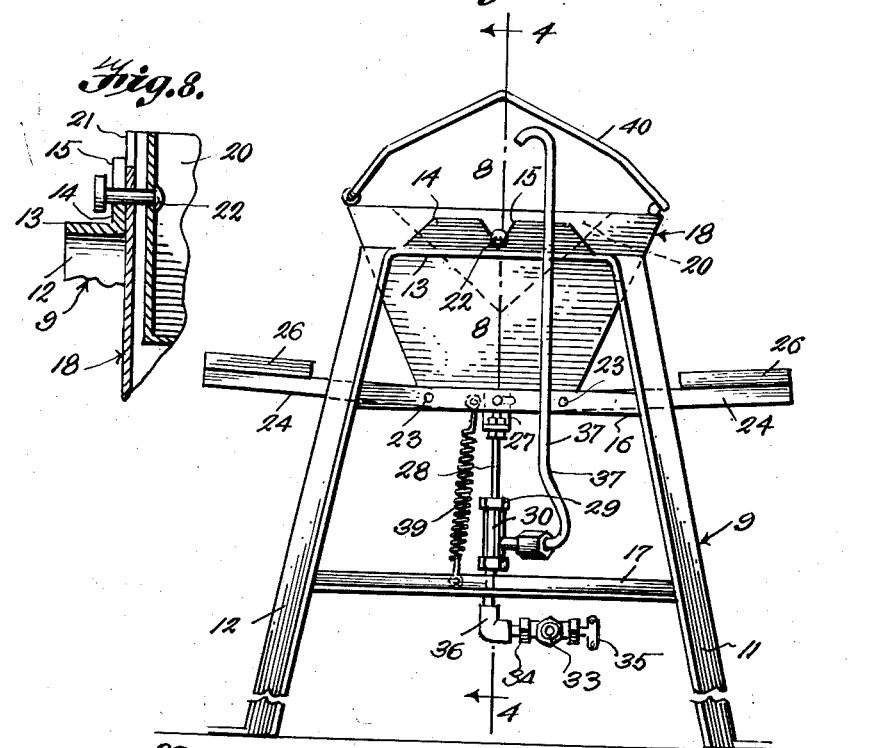
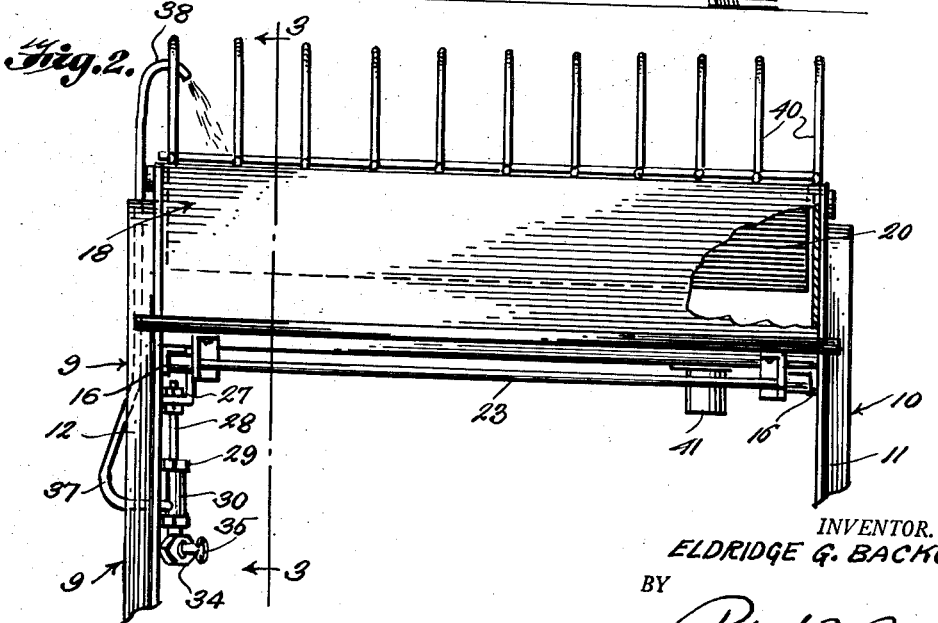
INVENTOR.
ELDRIDGE G. BACKUS
BY Patrick D. Beavers
ATTORNEY Sept. 7, 1954 E. G. BACKUS 2,688,310
SELF-CLEANING WATERING TROUGH FOR POULTRY
Filed Dec. 28, 1951 2 Sheets—Sheet 2
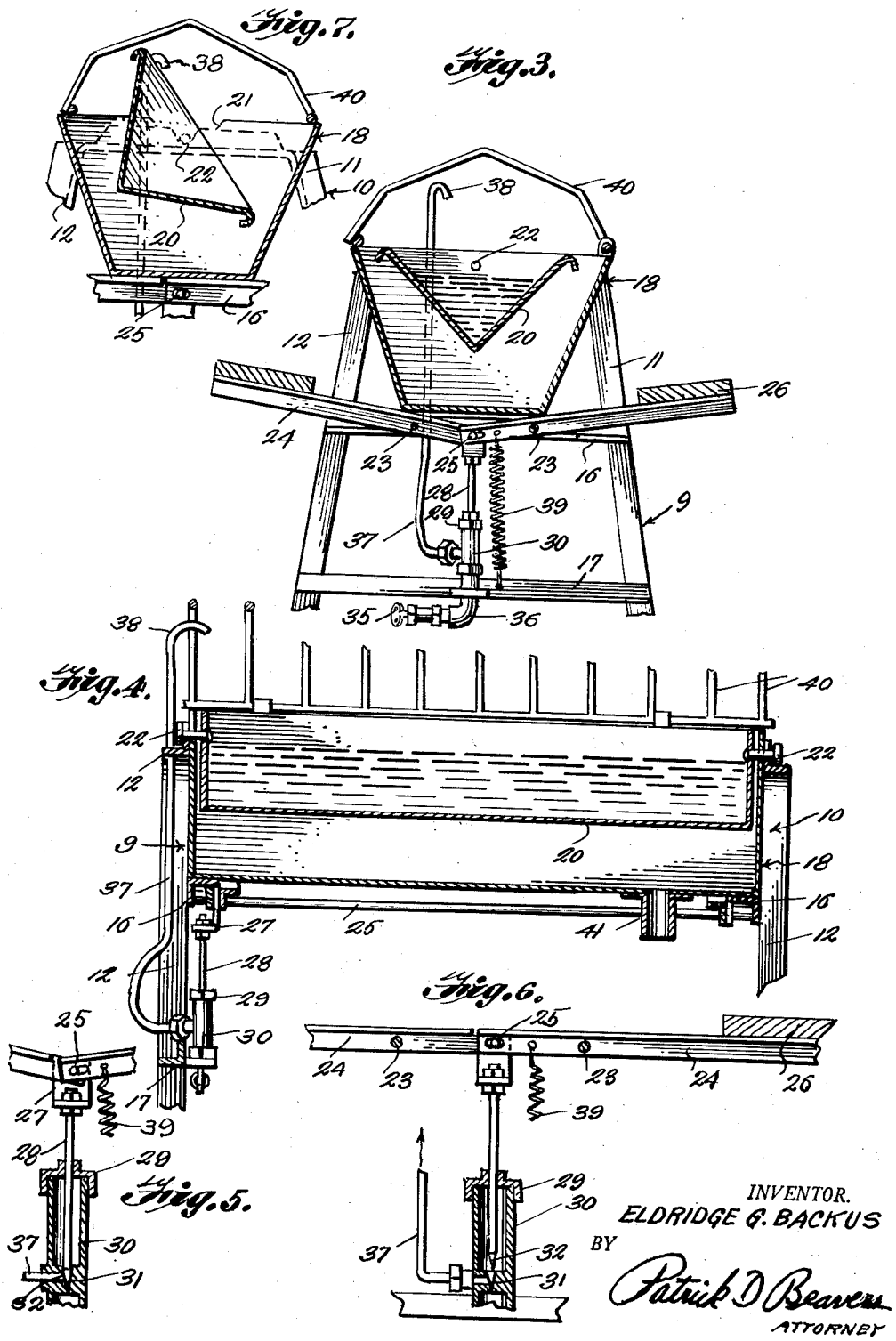
INVENTOR.
ELDRIDGE G. BACKUS
BY
Patrick D. Beavers
ATTORNEY Patented Sept. 7, 1954

2,688,310

UNITED STATES PATENT OFFICE 2,688,310

SELF-CLEANING WATERING TROUGH FOR POULTRY

Eldridge G. Backus, Palestine, Tex.

Application December 28, 1951, Serial No. 263,839

1 Claim. (Cl. 119—76)

The present invention relates to improvements in animal husbandry and more particularly to a watering trough for poultry.

The principal object of the present invention is to provide a self-cleaning watering trough for poultry, to the end that the trough will automatically flush so that substantially fresh and clean water always confronts the poultry.

Another important object of the invention is to provide a self-cleaning watering trough for poultry which is automatic, and in this connection is positive acting and not susceptible to the ready development of defects.

Still another object of the invention is to provide a watering trough for poultry wherein water is supplied to the trough by poultry action or weight of the poultry and wherein water is supplied to excess so that the water receiving trough will automatically dump periodically, thus relieving the trough of all foreign matter, to the end that the water which the poultry drinks will not become sour, or contaminated.

These and various other objects and advantages of the invention will become apparent to the reader of the following description.

In the drawings:

Figure 1 is an end elevational view of the watering trough.

Figure 2 is a fragmentary side elevational view with a portion broken away at one end of the large trough.

Figure 3 is a fragmentary vertical transverse sectional view taken substantially on line 3—3 of Figure 2.

Figure 4 is a fragmentary vertical longitudinal sectional view taken on line 4—4 of Figure 1.

Figure 5 is an enlarged fragmentary detailed sectional view showing the water supply valve in closed position.

Figure 6 is an enlarged fragmentary detailed sectional view showing the water supply valve in opened position.

Figure 7 is a fragmentary transverse sectional view showing the small trough in dumping position.

Figure 8 is an enlarged detailed sectional view taken on line 8—8 of Figure 1.

Referring to the drawing wherein like numerals designate like parts, it can be seen that the invention includes a pair of end frames 9, 10, each of these end frames being composed of upwardly converging angle iron legs 11, 12 connected together at their upper ends by a bridge 13. Each of the bridges has an upstanding flange 14 with a V-shaped recess 15 at a medial point.

The legs 11, 12 are further bridged by horizontal members 16, 17.

Numeral 18 denotes a large trough, suitably secured, as by welding or bolting to the flange 14 of bridge 13, this trough being open at its top. Within the top portion of the large trough 18 a small elongated trough 20 is supported, this trough being of preferably V-shape in cross-section.

It can be seen that the end walls of the trough 18 are formed with V-shaped notches 21 registering with the notches 15 in the flanges 14 and the ends of the small trough 20 have outstanding pintles 22 which rest in these notches, the flanges 14 and the end walls of the trough 18 at these notches serving to form bearings for the pintles 22.

On each of the horizontal members 16 are formed a pair of openings for receiving a pair of horizontally spaced rods 23, 23 and on each of these rods 23, 23 a pair of angle iron arms 24 are rockably mounted. The inner ends of the arms 24, that is of complemental arms are slotted and receive a third rod 25 which extends longitudinally under the trough 18. The outer ends of the arms 24 are bridged by platforms 26 upon which poultry can perch when drinking out of the trough 20.

An angle member 27 has an opening therein through which the rod 25 extends. The angle member also has an opening in its lower portion for receiving the upper end of a valve pin 28, which extends downwardly through the top 29 of a valve body 30, this valve body having a seat 31 in which the tapered end 32 of the valve pin 28 operates. As shown in Figure 1 a water supply line 33 extends to a fitting 34 in which is a pet cock or valve 35 and this fitting connects as at 36 to the bottom of the valve body 30. A tube 37 extends from the valve body 30 upwardly and has a gooseneck outlet end 38 terminating over one end of the small trough 20, as shown in Figures 2, 3 and 4.

A coiled tension spring 39 has one end connected to the inner end of one of the arms 24 while its other end is attached to the horizontal member 17.

One of these springs may be used at each end of the ensemble if desired and the purpose is to maintain the inner ends of the arms 24 pulled downwardly with resulting elevation of the platforms 26, this position of the platforms and arms serving to maintain the valve 28 in closed position as shown in Figure 5.

An anti-cribbing grill 40 is swingably mounted on the upper portion of the large trough 18 and extends over the small trough, as substantially shown in Figures 1, 2 and 3.

It will also be observed that the bottom of the large trough 18 has a drain neck 41 to which a drain pipe can be connected so that water from the large trough can be drained to the outside of the poultry house (not shown).

In the use and operation of the apparatus, it can be seen that with the valve 35 in opened position, water will be supplied to the valve shown in Figure 5, but the valve pin 28 will be in closed position due to the action of the spring 39. Supposing now, that a fowl perches on one of the platforms 26. His weight will overcome the spring or springs 39, resulting in the elevation of the inner ends of the arms 24. This action of the arms will lift the valve pin 28 displacing the tapered end 32 from the valve seat 31, permitting water from the water supply line 33 to pass by way of the seat 31 to the tube 37 and from there by way of the gooseneck 38 to the small trough 20. The fowl drinks from the trough 20, but it is to be understood that there is an excess supply of water to the trough 20, to the end that periodically the trough 20 will fill to the top and due to the offset delivery of water from the gooseneck 38 or from sloshing of the water in the trough 20, the trough will become overbalanced, swinging as to the position shown in Figure 7, liberating or dumping its water content into the large trough 8. This will serve to flush out the small trough 20 of any foreign matter such as feed carried into the same by the poultry. Thus the water is prevented from becoming sour or otherwise contaminated and fresh water has a tendency to maintain the chickens healthier with the prospect of a better egg poduction with respect to the hens. When the trough 20 empties it will right itself and will again refill and at some short time later, dump itself again. Thus the water content of the small trough 20 is always fresh and the water dumped into the large trough 18 is permitted to drain off through the drain neck 41 and a suitable drain conduit to the outside of the poultry house.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A watering trough for poultry comprising a stand, a large elongated trough supported by the stand, a small trough rockably supported within the large trough and adapted to rock to dumping position, a supply line operatively associated with said small trough, a drain connected to the large trough, a pair of spaced longitudinal rods carried by the stand, a poultry supporting platform rockably mounted on each of said rods and each extending longitudinally along one longitudinal side of said large trough, a pin-and-slot connection between the inner ends of said platforms, a tension spring interconnecting one of the inner end portions of a platform with a lower portion of said stand whereby to urge both platforms normally upwardly, a valve connected to said supply line and mounted on said stand below the inner ends of said platform, said valve including a valve stem connected at its upper end to the inner end of one of said platforms.

References Cited in the file of this patent

UNITED STATES PATENTS

| Number | Name | Date |
|---|---|---|
| 645,751 | Lewis | Mar. 20, 1900 |
| 713,799 | Reed | Nov. 18, 1902 |
| 1,092,387 | Perry | Apr. 7, 1914 |
| 1,563,414 | Wierdsma | Dec. 1, 1925 |
| 2,165,753 | Hobbs | July 11, 1939 |